(12) United States Patent
Kameoka et al.

(10) Patent No.: US 7,854,422 B2
(45) Date of Patent: Dec. 21, 2010

(54) SWIVEL DEVICE AND DISPLAY APPARATUS EQUIPPED WITH THE SAME

(75) Inventors: Shinichi Kameoka, Osaka (JP); Akihiro Fujikawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 302 days.

(21) Appl. No.: 11/785,829

(22) Filed: Apr. 20, 2007

(65) Prior Publication Data

US 2007/0252064 A1 Nov. 1, 2007

(30) Foreign Application Priority Data

Apr. 27, 2006 (JP) ............... 2006-123517

(51) Int. Cl.
*H04N 5/64* (2006.01)
*G09F 9/00* (2006.01)

(52) U.S. Cl. ............... 248/349.1; 248/917; 361/679.02; 361/679.21; 348/836

(58) Field of Classification Search ............. 248/349.1, 248/550, 658, 521, 522, 131, 917; 361/681, 361/679.02, 679.21; 74/27; 108/139, 147; 348/836, E5.132, 794; 211/163
See application file for complete search history.

(56) References Cited

U.S. PATENT DOCUMENTS

| | | | | |
|---|---|---|---|---|
| 3,813,491 A | * | 5/1974 | Pennar | .................. 348/827 |
| 4,905,543 A | * | 3/1990 | Choi | ..................... 74/827 |
| 6,536,721 B1 | | 3/2003 | Kao | |
| 6,739,566 B1 | * | 5/2004 | Kao | ..................... 248/522 |
| 2008/0100997 A1 | * | 5/2008 | Chen | ..................... 361/681 |
| 2008/0111929 A1 | * | 5/2008 | Yokota et al. | ............. 348/836 |

FOREIGN PATENT DOCUMENTS

| | | |
|---|---|---|
| EP | 1 662 194 A1 | 5/2006 |
| JP | A-06-292106 | 10/1994 |
| JP | 2000-31663 | 1/2000 |
| JP | A-2005-109626 | 4/2005 |
| JP | 2007295476 A * | 11/2007 |
| WO | WO 2005/022024 A1 | 3/2005 |

* cited by examiner

*Primary Examiner*—Anita M King
(74) *Attorney, Agent, or Firm*—Morgan Lewis & Bockius LLP

(57) ABSTRACT

A swivel device for a display apparatus includes: a swivel mechanism to which a lead wire is connected; a swivel member that is capable of being turned by the swivel mechanism; a swivel mechanism housing portion that houses the swivel mechanism that is disposed so as to overlap the swivel member; a fixing member that fixes the swivel mechanism housing portion; and an attachment member that is attached to the swivel mechanism housing portion, and the swivel mechanism housing portion is provided with a first engaging portion for positioning the attachment member, and the attachment member is provided with a second engaging portion that engages the first engaging portion and has a draw out portion for drawing out the lead wire from the swivel mechanism housing portion.

6 Claims, 10 Drawing Sheets

SWIVEL DEVICE AND DISPLAY APPARATUS EQUIPPED WITH THE SAME

This application is based on Japanese Patent Application No. 2006-123517 filed on Apr. 27, 2006, the contents of which are hereby incorporated by reference.

BACKGROUND OF THE INVENTION

1. Field of the Invention

The present invention relates to a swivel device and a display apparatus equipped with the device.

2. Description of Related Art

There is known a swivel device that supports a display portion of a video display apparatus such as a liquid crystal TV set and turns around the vertical axis so that orientation of the video display portion can be changed (for example, see JP-A-06-292106 and JP-A-2005-109626).

JP-A-06-292106 discloses a turn table (a swivel device) equipped with a swivel gear disposed on a base in a pivotable manner around the vertical axis, and a swivel frame disposed on the swivel gear in a pivotable manner around the vertical axis. This turn table includes a motor and a speed reduction gear mechanism outside the swivel frame, and a driving force of the motor is transmitted to the swivel gear via the speed reduction gear mechanism, so that the swivel gear turns. The swivel frame is adapted to be capable of turning when the swivel gear turns.

JP-A-2005-109626 discloses a swivel device equipped with a fixed portion and a movable portion that is adapted to be capable of turning around the vertical axis with respect to the fixed portion, in which a motor and a transmission mechanism are disposed inside the movable portion, while a rack gear that engages a gear of the transmission mechanism is provided to the fixed portion. In this swivel device, a driving force of the motor inside the movable portion is transmitted to the rack gear via the transmission mechanism so that the movable portion can be turned around the vertical axis. A lead wire cable (lead wire) for supplying electric power to the motor is drawn out onto the top surface of the movable portion, and this lead wire cable is drawn out externally through an opening formed in a cover member that covers the movable portion. The lead wire cable drawn out through the opening of the cover member is connected electrically to a lead wire cable drawn out from a display apparatus main body (the video display portion). Thus, electric power is supplied from the display apparatus main body (video display portion) to the motor inside the movable portion.

However, since the conventional turn table (swivel device) described in JP-A-06-292106 has the structure in which the speed reduction gear mechanism and the motor for turning the swivel gear are disposed outside the swivel frame, it is necessary to ensure a region for disposing the speed reduction gear mechanism and the motor outside the region where the swivel gear and the swivel frame are disposed. Therefore, there is a problem that the turn table becomes large by the region where the speed reduction gear mechanism and the motor are disposed.

According to the conventional swivel device described in JP-A-2005-109626, a swivel member can be downsized because the motor and the transmission mechanism are disposed inside the movable portion. However, since the motor and the transmission mechanism turns together with the movable portion, the lead wire cable drawn out onto the top surface of the movable portion also turns together with the movable portion. Therefore, there is a problem that the lead wire cable can be damaged when it contacts with the opening of the cover member as the movable portion turns.

SUMMARY OF THE INVENTION

In view of the above described problems, it is an object of the present invention to provide a swivel device that can be downsized and can suppress damage to the lead wire, and a display apparatus equipped with the swivel device.

To attain the above described problems, a swivel device according to a first aspect of the present invention includes: a swivel mechanism to which a lead wire is connected; a swivel member that is capable of being turned by the swivel mechanism; a swivel mechanism housing portion that houses the swivel mechanism that is disposed so as to overlap the swivel member; a fixing member that fixes the swivel mechanism housing portion; and an attachment member that is attached to the swivel mechanism housing portion. Further the swivel device is characterized by a structure in which the swivel mechanism housing portion is provided with a first engaging portion for positioning the attachment member, and the attachment member is provided with a second engaging portion that engages the first engaging portion and has a draw out portion for drawing out the lead wire from the swivel mechanism housing portion.

This swivel device according to the first aspect includes the swivel mechanism housed inside the swivel mechanism housing portion, and the swivel mechanism housing portion is disposed in the fixing member so as to overlap the swivel member, so that the region in the fixing member where the swivel mechanism housing portion is disposed can be shared as the region where the swivel member is disposed. Therefore, when the swivel mechanism is housed in the swivel mechanism housing portion, the region in the fixing member where the swivel mechanism is disposed can also be shared with the region where the swivel member is disposed. For this reason, unlike the case where the swivel mechanism is disposed outside the fixing member, it is not necessary to prepare the region outside the fixing member where the swivel mechanism should be disposed, thereby the device can be downsized. Since the swivel mechanism is housed inside the swivel mechanism housing portion and the swivel mechanism housing portion is fixed to the fixing member, the swivel mechanism housed inside the swivel mechanism housing portion can be prevented from turning when the swivel member is turned. Therefore, even if the swivel member is turned, the lead wire can be in the static state. Thus, damage to the lead wire that can be generated due to pulling or the like of the lead wire can be suppressed. Since the swivel mechanism housing portion is provided with the first engaging portion having a function of positioning the attachment member while the attachment member is provided with a second engaging portion that engages the first engaging portion and has the draw out portion for drawing out the lead wire from the swivel mechanism housing portion, the attachment member can be attached to a predetermined position of the swivel mechanism housing portion when the second engaging portion engages the first engaging portion. In addition, the lead wire can be drawn out from the swivel mechanism housing portion through the draw out portion of the second engaging portion. Thus, the lead wire can be drawn out from the swivel mechanism housing portion without providing an additional draw out portion besides the second engaging portion. Since it is not necessary to provide an additional draw out portion besides the second engaging portion, the number of manufacturing steps can be reduced.

Preferably in the swivel device according to the first aspect described above, the attachment member includes a protrusion having the second engaging portion, the swivel member includes an opening in which the protrusion is inserted, and the protrusion is adapted to restrict a movable range of the swivel member by abutting the opening of the swivel member when the swivel member is turned. According to this structure, the lead wire can be drawn out from the swivel mechanism housing portion through the draw out portion of the second engaging portion provided to the protrusion while the protrusion can restrict the movable range of the swivel member. Therefore, compared to the case where the second engaging portion having the draw out portion is provided to a part except the protrusion, a mechanism of the device can be downsized easily. As a result, the device can be downsized easily while the number of manufacturing steps can be reduced easily.

Preferably in the swivel device according to the above described second aspect, the first engaging portion is provided integrally to the swivel mechanism housing portion, and the protrusion is provided integrally to the attachment member. According to this structure, an increase in the number of components can be suppressed even if the first engaging portion is provided to the swivel mechanism housing portion and the protrusion is provided to the attachment member.

Preferably in the swivel device according to the above described third aspect, the swivel mechanism includes a driving source for turning the swivel member, the lead wire is connected electrically to the driving source, and the protrusion is disposed in the vicinity of the driving source. According to this structure, since the draw out portion of the second engaging portion can be disposed in the vicinity of the driving source, the lead wire can be drawn out easily to the outside of the swivel mechanism housing portion through the draw out portion. Therefore, the lead wire can be prevented from contacting the swivel mechanism, so that damage to the lead wire due to a contact between the lead wire and the swivel mechanism can be suppressed easily.

To attain the above described problems, a swivel device according to a fifth aspect of the present invention includes: a swivel mechanism that includes a driving source to which a lead wire is connected; a swivel member that is capable of being turned by the swivel mechanism; a swivel mechanism housing portion that houses the swivel mechanism that is disposed so as to overlap the swivel member; a fixing member that fixes the swivel mechanism housing portion; and an attachment member that is attached to the swivel mechanism housing portion, to which a protrusion is provided integrally. Further, the swivel device is characterized by a structure in which the swivel member includes an opening to which the protrusion is inserted, the protrusion of the attachment member is designed so as to restrict a movable range of the swivel member by abutting the opening of the swivel member when the swivel member is turned, and is disposed in the vicinity of the driving source, the swivel mechanism housing portion is provided integrally with a first engaging portion that has a function of positioning the attachment member, and the protrusion of the attachment member is provided with a second engaging portion that engages the first engaging portion provided to the swivel mechanism housing portion and has a draw out portion for drawing out the lead wire from the swivel mechanism housing portion.

The display apparatus according to the sixth aspect of the present invention is equipped with the swivel device according to the first aspect described above. According to this structure, it is possible to obtain a display apparatus equipped with the swivel device that can be downsized and can suppress damage to the lead wire.

Since the swivel device according to the first aspect of the present invention can share the region in the fixing member where the swivel mechanism housing portion is disposed as the region where the swivel member is disposed by disposing the swivel mechanism housing portion in the fixing member so as to overlap the swivel member as described above, the region in the fixing member where the swivel mechanism is disposed can also be shared with the region where the swivel member is disposed by housing the swivel mechanism inside the swivel mechanism housing portion. Therefore, unlike the case where the swivel mechanism is disposed outside the fixing member, it is not necessary to prepare the region outside the fixing member where the swivel mechanism should be disposed, thereby the device can be downsized. Since the swivel mechanism is housed inside the swivel mechanism housing portion and the swivel mechanism housing portion is fixed to the fixing member, the swivel mechanism housed inside the swivel mechanism housing portion can be prevented from turning when the swivel member is turned. Therefore, even if the swivel member is turned, the lead wire can be in the static state. Thus, damage to the lead wire that can be generated due to pulling or the like of the lead wire can be suppressed. Since the swivel mechanism housing portion is provided with the first engaging portion having a function of positioning the attachment member while the attachment member is provided with a protrusion, and the protrusion is provided with the second engaging portion that engages the first engaging portion and has a draw out portion for drawing out the lead wire from the swivel mechanism housing portion, the attachment member can be attached to a predetermined position of the swivel mechanism housing portion when the second engaging portion engages the first engaging portion. In addition, the lead wire can be drawn out from the swivel mechanism housing portion through the draw out portion of the second engaging portion. Therefore, the lead wire can be drawn out from the swivel mechanism housing portion without providing an additional draw out portion besides the second engaging portion. For this reason, the number of manufacturing steps can be reduced because it is not necessary to prepare an additional draw out portion besides the second engaging portion.

According to the first aspect of the present invention, the swivel member is designed to include an opening in which the protrusion is inserted, and the protrusion is designed to restrict a movable range of the swivel member by abutting the opening of the swivel member when the swivel member is turned. Thus, the lead wire can be drawn out from the swivel mechanism housing portion through the draw out portion of the second engaging portion provided to the protrusion, and the protrusion can restrict a movable range of the swivel member, so that the mechanism of the device can be simplified compared to the case where the second engaging portion having the draw out portion is provided to a part except the protrusion. As a result, the device can be downsized easily, and the number of manufacturing steps can be reduced easily. Since the first engaging portion is provided integrally to the swivel mechanism housing portion while the protrusion is provided integrally to the attachment member, an increase in the number of components can be suppressed even if the first engaging portion is provided to the swivel mechanism housing portion while the protrusion is provided to the attachment member. Since the protrusion is disposed in the vicinity of the driving source, the draw out portion of the second engaging portion can be disposed in the vicinity of the driving source. Therefore, the lead wire can be drawn out easily through the draw out portion to the outside of the swivel mechanism housing portion. Since the lead wire is prevented from contacting the swivel mechanism, damage to the lead wire due to a contact between the lead wire and the swivel mechanism can be suppressed easily.

DETAILED DESCRIPTION OF THE PREFERRED EMBODIMENTS

Hereinafter, embodiments of the present invention will be described with reference to the attached drawings.

Figure 1:
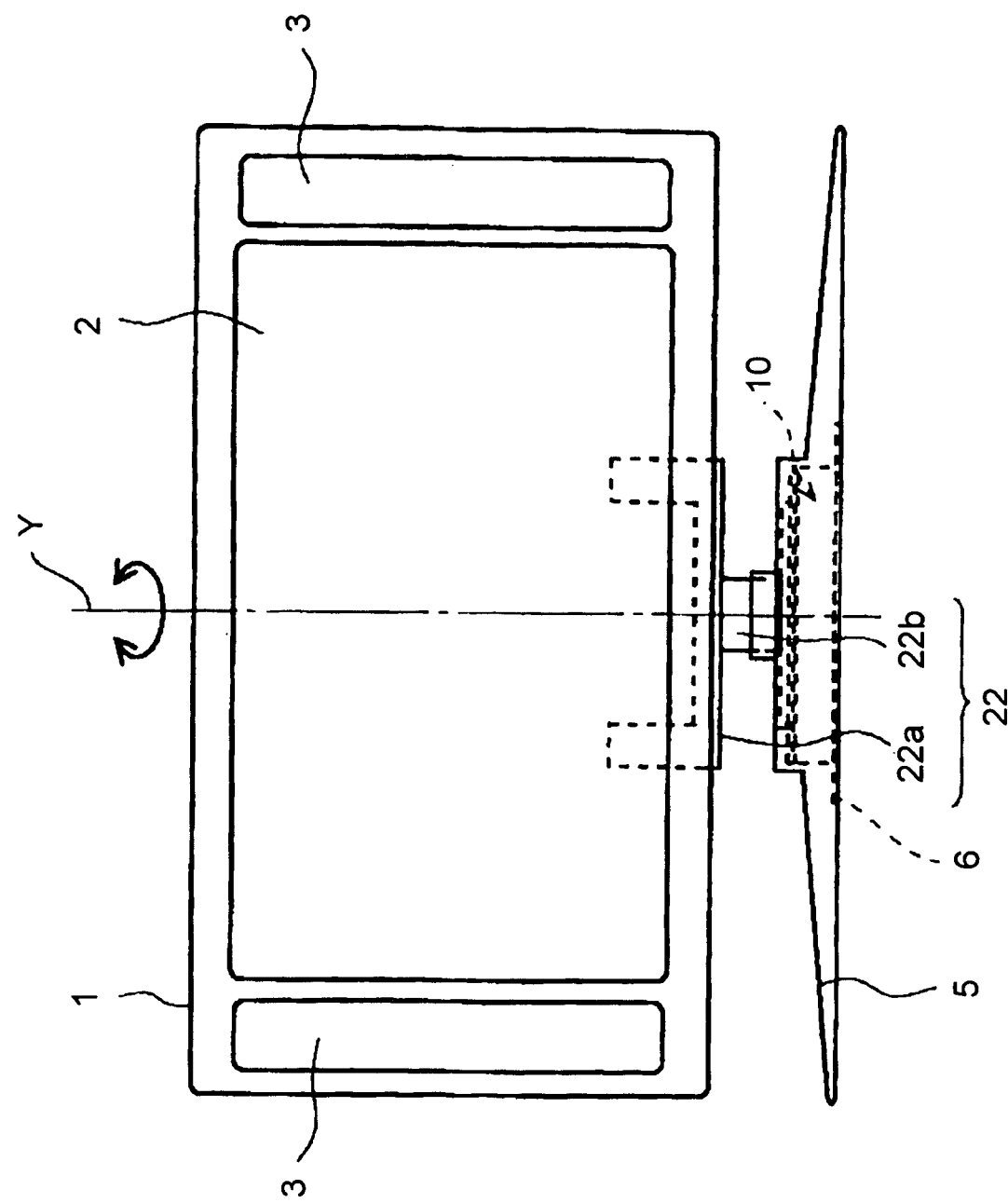
FIG. 1 is a front view to show a display apparatus equipped with a swivel device according to an embodiment of the present invention.
Figure 2:
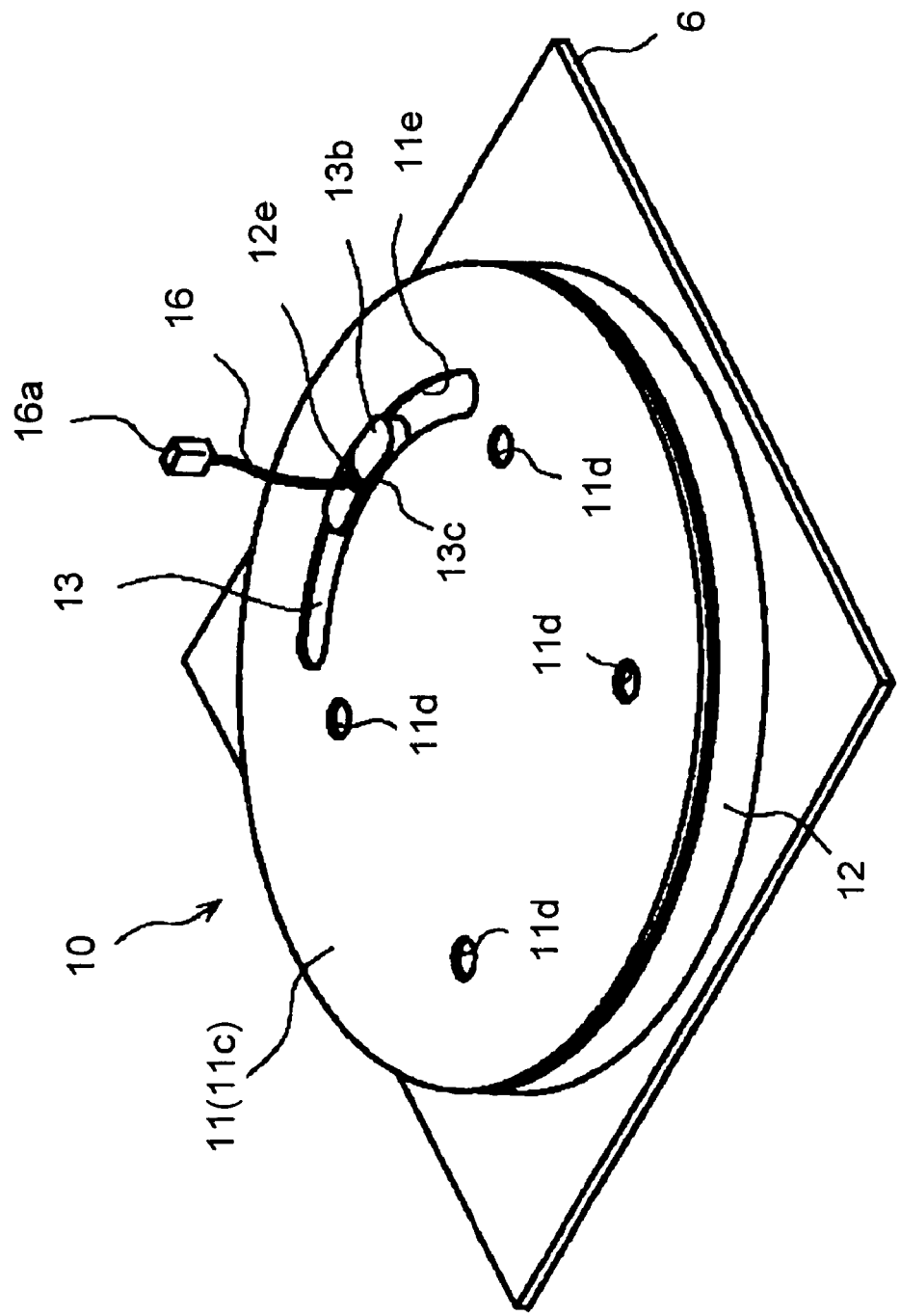
FIG. 2 is a perspective view of the swivel device shown in FIG. 1.

FIG. 1 is a front view to show a display apparatus equipped with a swivel device according to an embodiment of the present invention. FIG. 2 is a perspective view of the swivel device shown in FIG. 1. FIGS. 3-8 are diagrams for explaining the swivel device according to an embodiment shown in FIG. 1. First, structures of the swivel device according to the present embodiment and the display apparatus equipped with the device will be described with reference to FIGS. 1-8.

As shown in FIG. 1, the display apparatus according to the present embodiment includes a display apparatus main body portion 1, a swivel device 10 that turns the display apparatus main body portion 1 around the vertical axis (Y axis), a connection member 22 that connects the display apparatus main body portion 1 to the swivel device 10, a cover member 5 that covers the swivel device 10, and a base member 6 that fixes the swivel device 10. The display apparatus main body portion 1 of the present embodiment is a liquid crystal television set having reduced thickness equipped with a video display portion 2 and speaker portions 3. The base member 6 is an example of a "fixing member" in the present invention.

Figure 3:
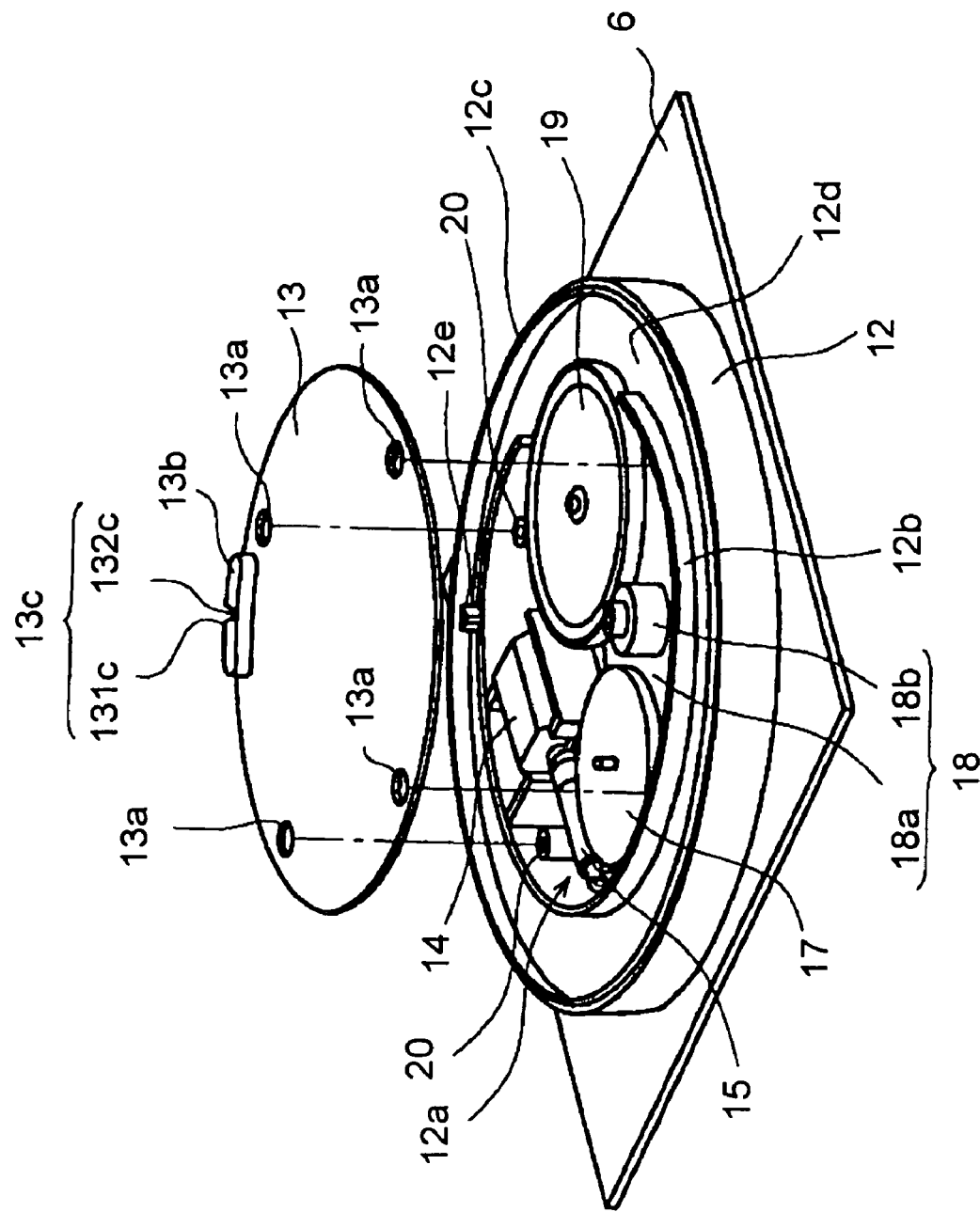
FIG. 3 is a perspective view for explaining an inner structure of the swivel device shown in FIG. 1.
Figure 4:
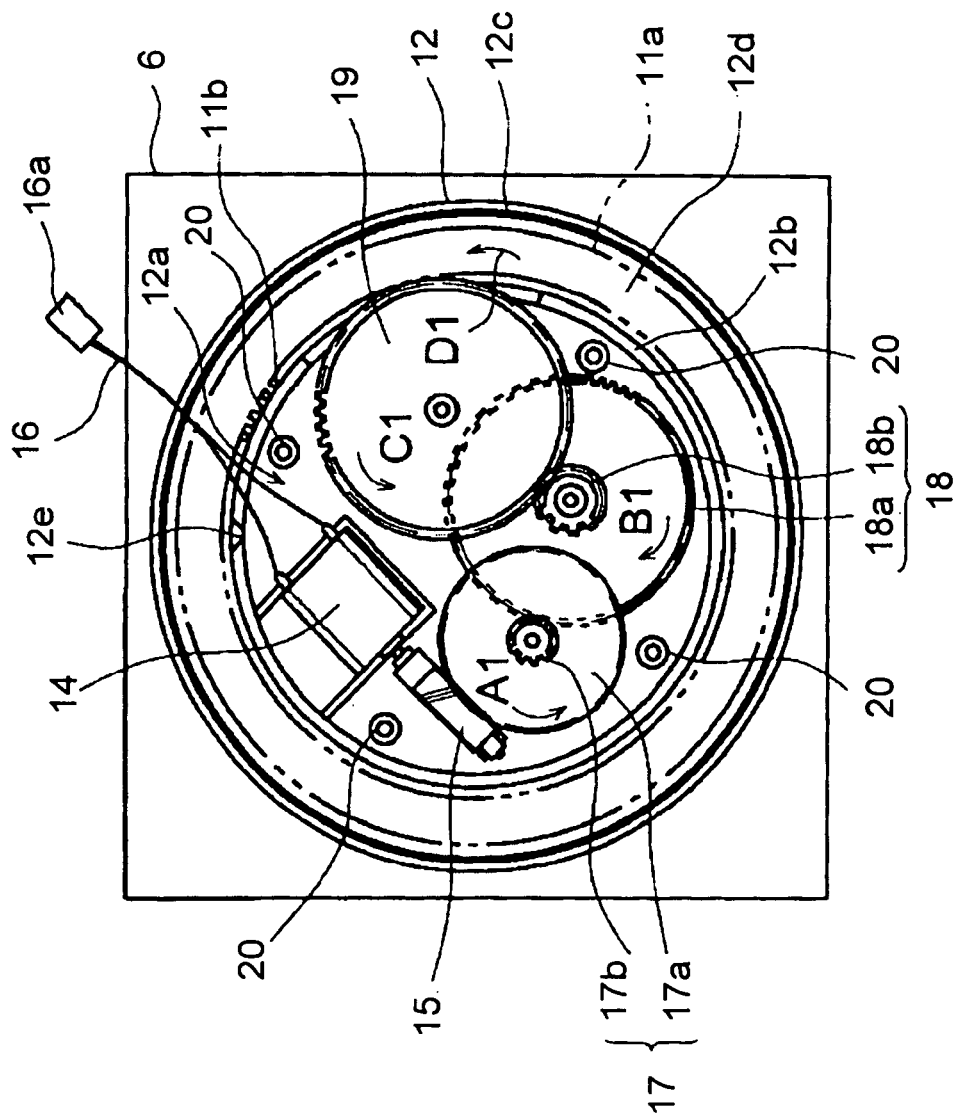
FIG. 4 is a plan view for explaining an inner structure of the swivel device shown in FIG. 1.
Figure 6:
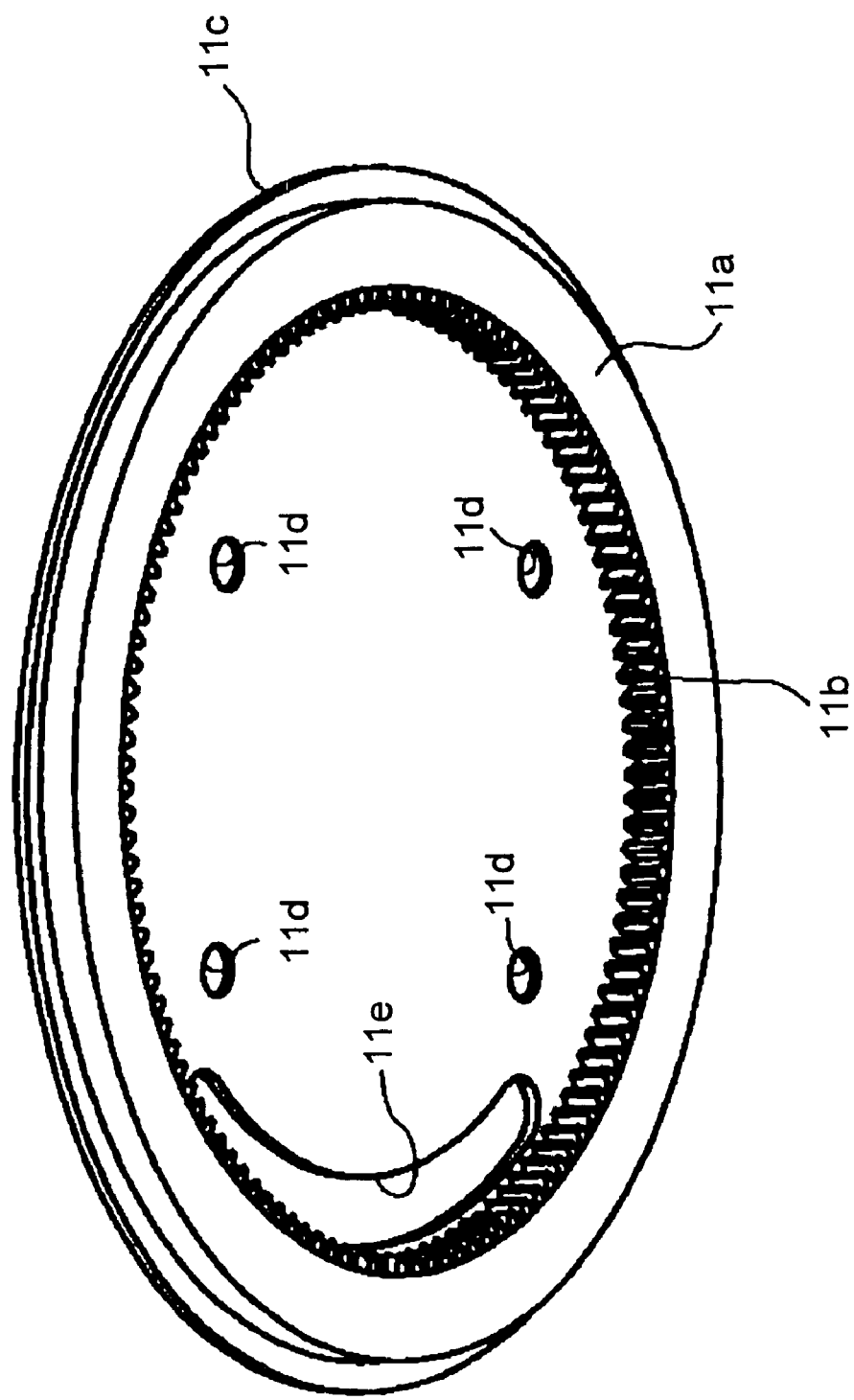
FIG. 6 is a perspective view of the swivel member of the swivel device shown in FIG. 1 viewed from the rear side.

As shown in FIGS. 2 and 3, the swivel device 10 includes a swivel member 11, a housing member 12 and a lid body 13 that is attached to the housing member 12. As shown in FIG. 6, the swivel member 11 is made up of a ring member 11a having a gear 11b on the inner edge and a disk member 11c to which the connection member 22 is attached. This disk member 11c is provided with threaded holes 11d for screwing the connection member 22 and a circular arc opening 11e in which a boss portion 13b is inserted, which will be described later. As shown in FIGS. 3 and 4, the housing member 12 includes a housing portion 12a having a cylindrical shape for housing a swivel mechanism that turns the swivel member 11 inside it. The housing member 12 has standing walls 12b and 12c that are provided to the inner edge and the outer edge, respectively. The inner standing wall 12b and the outer standing wall 12c form a circular recess 12d to which the ring member 11a of the swivel member 11 is attached. The housing member 12 is an example of a "swivel mechanism housing portion" in the present invention, and the lid body 13 is an example of an "attachment member" in the present invention.

A motor 14 to be a driving source for turning the swivel member 11 is fixed to the housing portion 12a of the housing member 12. A worm gear 15 for transmitting a driving force of the motor 14 to a gear 17 that will be described later is attached to a rotating shaft of the motor 14, and an end of the motor 14 is connected electrically to a lead wire 16 for supplying electric power to the motor 14. An end of the lead wire 16 is provided with a connector 16a for connecting the lead wire 16 electrically to a wire (not shown) of the display apparatus main body portion 1. In the housing portion 12a of the housing member 12, there are disposed three gears 17, 18 and 19 in a rotatable manner for transmitting the driving force of the motor 14 at a predetermined force with reduced rotation speed of the motor 14. The gear 17 is made up of a major diameter gear 17a and a minor diameter gear 17b that are formed integrally, while the gear 18 is made up of a major diameter gear 18a and a minor diameter gear 18b that are formed integrally. The major diameter gear 17a of the gear 17 engages the worm gear 15, while the minor diameter gear 17b of the gear 17 engages the major diameter gear 18a of the gear 18. The minor diameter gear 18b of the gear 18 engages the gear 19. The gear 19 is arranged so that a part of it protrudes through a slit of the inner standing wall 12b of the housing member 12 toward the recess 12d of the housing member 12. The housing portion 12a is provided with screw fastening portions 20 for fastening the lid body 13 with screws 21 (see FIG. 5). The motor 14 is an example of the "driving source" in the present invention.

The recess 12d of the housing member 12 is designed so that ring member 11a of the swivel member 11 can be placed in it in a rotatable manner as shown in FIG. 4. Thus, the swivel member 11 and the housing member 12 are arranged so as to overlap each other. The gear 11b of the ring member 11a is designed so as to engage the gear 19 protruding toward the recess 12d when the ring member 11a is placed in the recess 12d of the housing member 12. Thus, the driving force of the motor 14 is transmitted to the ring member 11a via the worm gear 15 and gears 17-19, so that the swivel member 11 can be turned. At this point, the motor 14, the worm gear 15 and gears 17-19 constitute the swivel mechanism.

Figure 5:
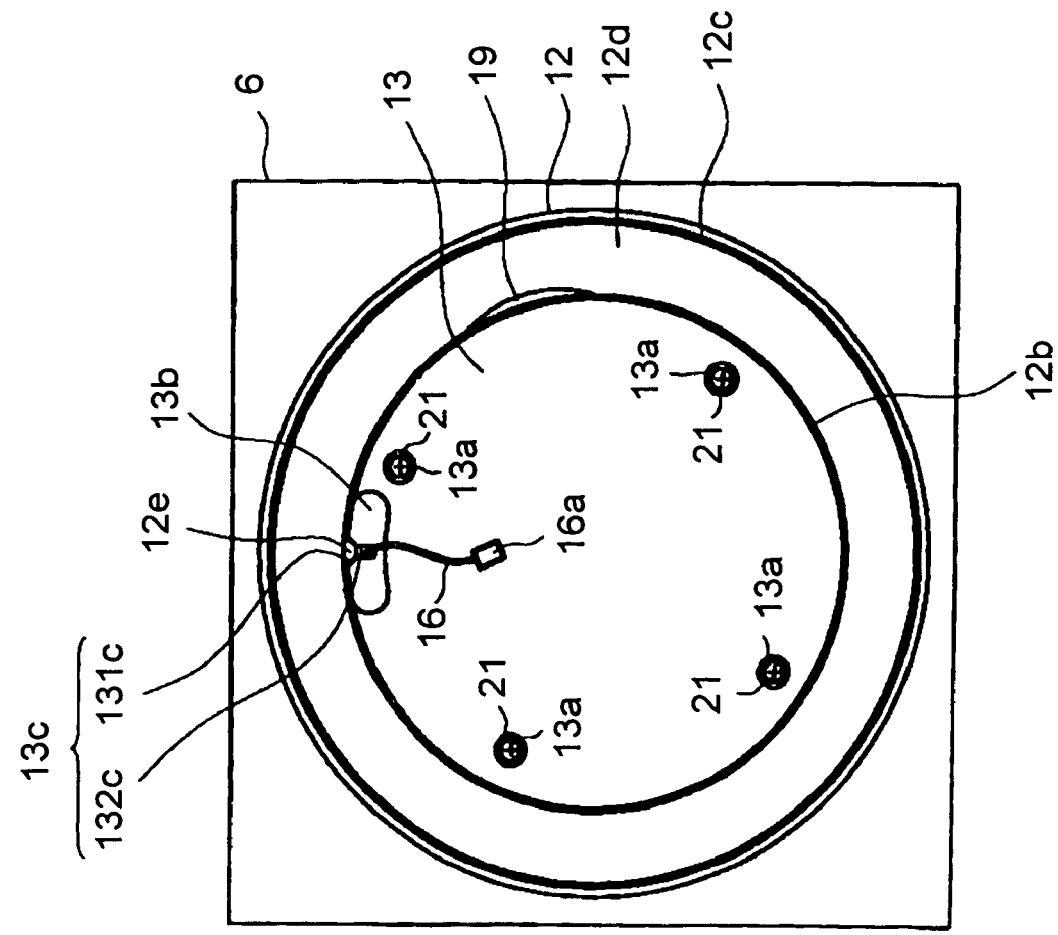
FIG. 5 is a plan view of the swivel device shown in FIG. 1 from which a swivel member is removed.

As shown in FIGS. 3 and 5, the lid body 13 has a function of preventing dusts or the like from entering the housing portion 12a when it is attached to the housing member 12 so as to cover the upper portion of the housing portion 12a. This lid body 13 is designed to be fixed to the upper portion of the housing portion 12a with screws 21 through holes 13a. A predetermined region of the lid body 13 on the outer periphery is provided with a boss portion 13b of a circular arc rib protruding upward in an integral manner. This boss portion 13b is inserted in the opening 11e of the swivel member 11 and has a function of restricting a movable range of the swivel member 11 by abutting one or other end of the opening 11e when the swivel member 11 is turned.

Figure 7:
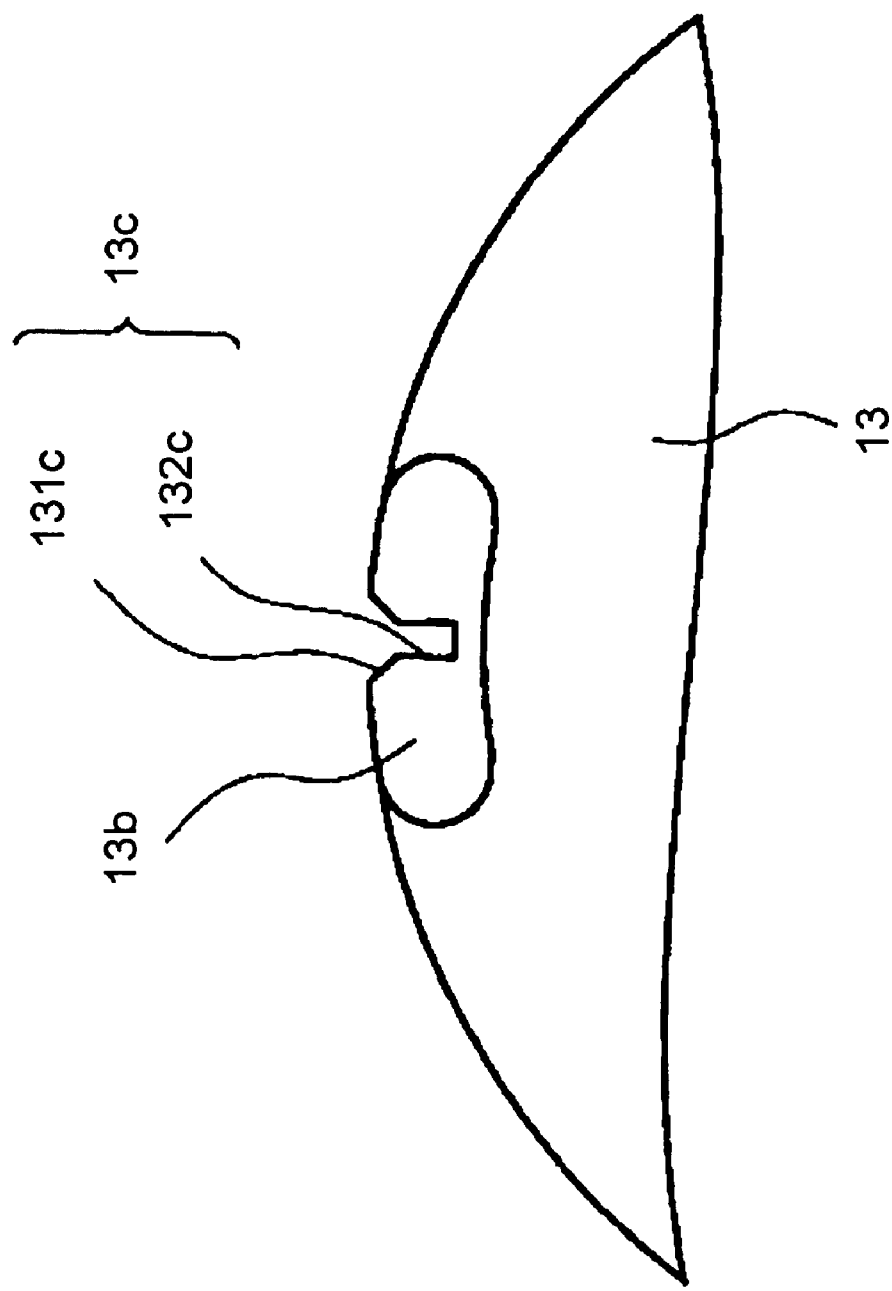
FIG. 7 is a plan view of a boss portion provided to a lid body of the swivel device shown in FIG. 1.

In the present embodiment, as shown in FIG. 4, a protrusion 12e having a horizontal cross section of a trapezoidal shape is provided integrally to the housing member 12 so as to extend in the vertical direction on the inner side of the housing member 12 at the vicinity of the motor 14. As shown in FIGS. 5 and 7, a notch portion 13c that engages the protrusion 12e of the housing member 12 is provided to the outer side face of the boss portion 13b of the lid body 13 so as to extend in the vertical direction. As shown in FIG. 7, this notch portion 13c is made up of a first notch portion 131c having a horizontal cross section of a trapezoidal shape and a second notch portion 132c having a horizontal cross section of a rectangular shape. When the first notch portion 131c of the notch portion 13c engages the protrusion 12e of the housing member 12, positioning of the lid body 13 with respect to the housing member 12 is performed. In this case, since the protrusion 12e of the housing member 12 is disposed at the vicinity of the motor 14, the lid body 13 is attached to the housing member 12 so that boss portion 13b of the lid body 13 is placed at the vicinity of the motor 14 when the notch portion 13c of the boss portion 13b (the first notch portion 131c) engages the protrusion 12e.

In the present embodiment, the second notch portion 132c of the notch portion 13c does not engage the protrusion 12e of the housing member 12 even in the case where the lid body 13 is attached to the housing member 12. Therefore, when the lid body 13 is attached to the housing member 12, the second notch portion 132c of the notch portion 13c forms a through hole extending from the top surface of the boss portion 13b to the housing portion 12a of the housing member 12. As a result, the lead wire 16 can be drawn out from the housing portion 12a of the housing member 12 to the top surface of the boss portion 13b through the second notch portion 132c. Even in the case where the connector 16a is provided to one end of the lead wire 16, the lead wire 16 can be drawn out from the housing portion 12a of the housing member 12 through the second notch portion 132c of the notch portion 13c without providing a draw out portion (a through hole) having a shape larger than the connector 16a. At this point, the boss portion 13b is an example of a "protrusion" in the present invention, while the protrusion 12e is an example of a "first engaging portion" in the present invention. The notch portion 13c is an example of a "second engaging portion" in the present invention, and the second notch portion 132c is an example of a "draw out portion" in the present invention.

Figure 8:
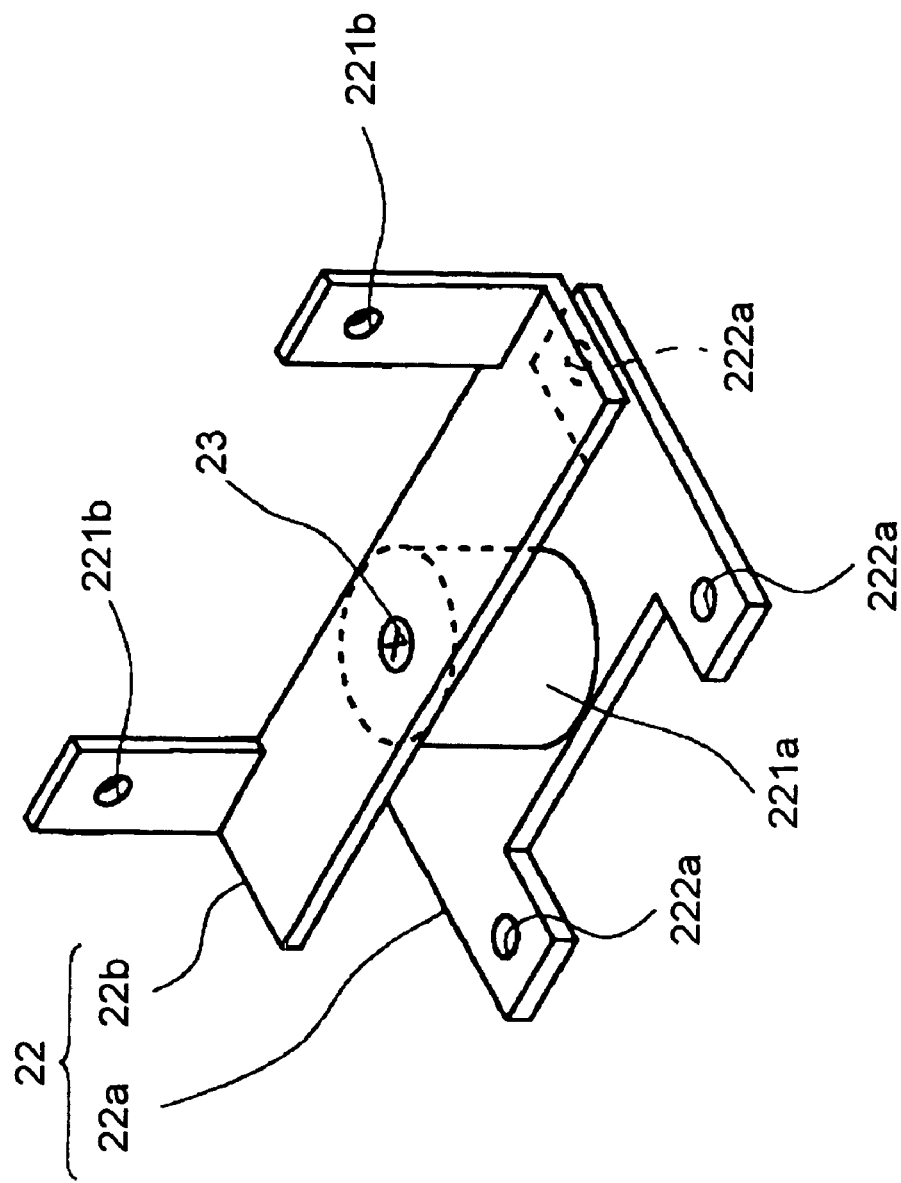
FIG. 8 is a perspective view of a connection member that connects the swivel device shown in FIG. 1 to a display apparatus main body portion.

As shown in FIG. 8, the connection member 22 is made up of a first connection member 22a that is attached to the disk member 11c of the swivel member 11 and a second connection member 22b that is attached to the display apparatus main body portion 1. The second connection member 22b is designed to be fixed to a support pillar portion 221a of the first connection member 22a with a screw 23. The first connection member 22a is provided with four threaded holes 222a for fastening to the disk member 11c of the swivel member 11, and the second connection member 22b is provided with the threaded holes 221b for fastening to the display apparatus main body portion 1 with screws (not shown).

As shown in FIGS. 1-5, the base member 6 has a function of fixing the housing member 12. The cover member 5 has a function of covering the swivel device 10 as shown in FIG. 1, so that the swivel device 10 cannot be seen from outside. An opening hole 5a (see FIG. 9) is provided to a predetermined region of the cover member 5 for drawing out lead wire 16 that is connected to the motor 14 electrically to the outside of the cover member 5.

Figure 9:
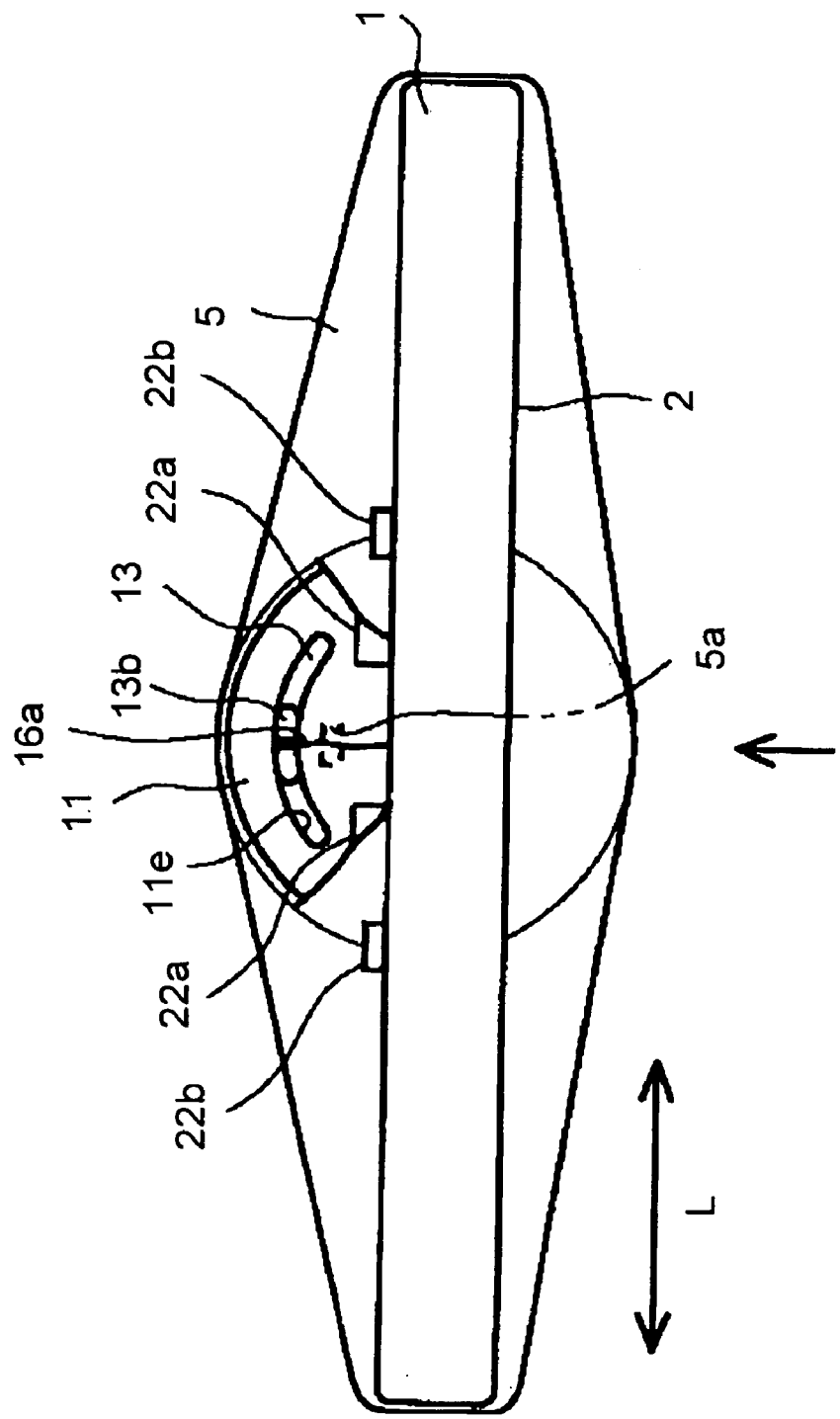
FIG. 9 is a plan view for explaining a swivel operation of the display apparatus equipped with the swivel device shown in FIG. 1.
Figure 10:
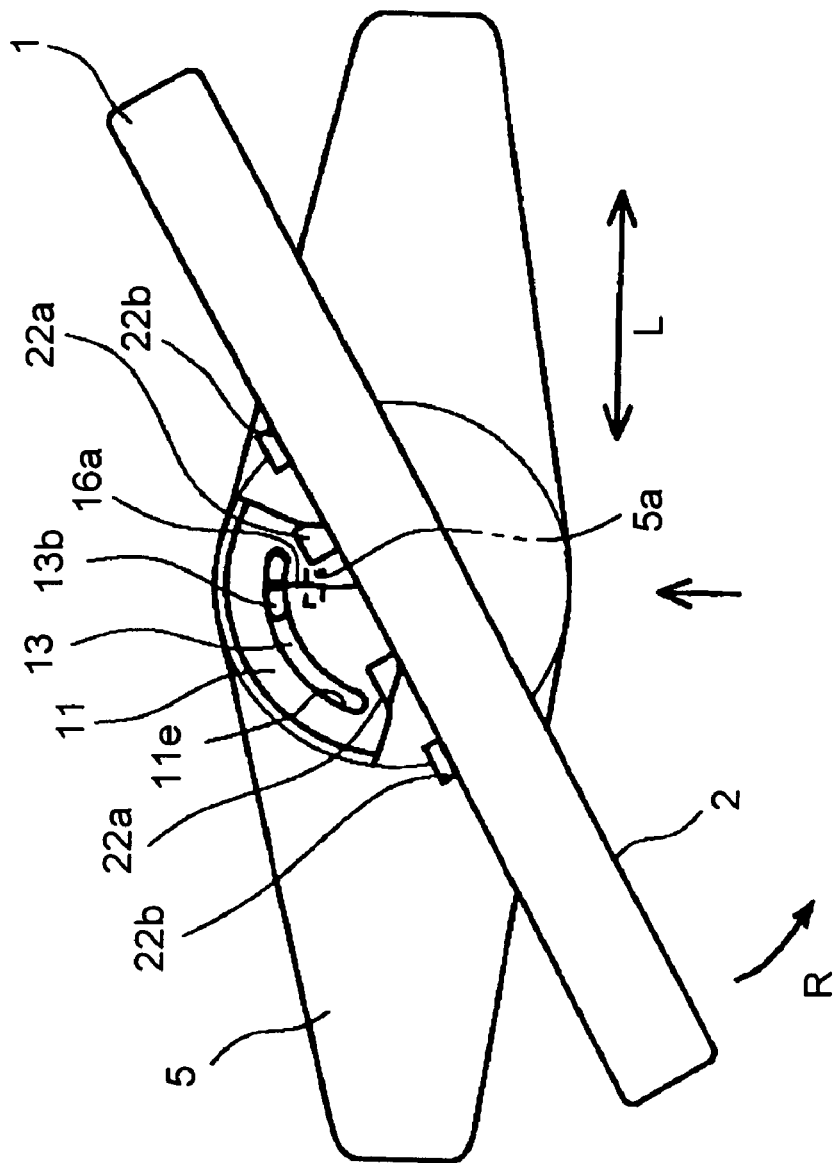
FIG. 10 is a plan view for explaining a swivel operation of the display apparatus equipped with the swivel device shown in FIG. 1.

FIGS. 9 and 10 are plan views for explaining a swivel operation of the display apparatus equipped with the swivel device shown in FIG. 1. Next, with reference to FIGS. 4, 9 and 10, a swivel operation of the display apparatus equipped with the swivel device 10 according to the present embodiment will be described. At this point, the vertical arrows shown in FIG. 9 and 10 indicate the front side of the display apparatus main body portion 1 before the swivel operation begins.

First, in an initial state, the display apparatus main body portion 1 is positioned in parallel with the direction in which the cover member 5 extends (the direction of the arrow L) as shown in FIG. 9 (in the state where the video display portion 2 faces the front). When the motor 14 is activated from this state, the worm gear 15 is turned so as to transmit the driving force of the motor 14 to the gear 17, so that the gear 17 is turned in the direction of the arrow A1 as shown in FIG. 4. Consequently, the gear 18 is turned in the direction of the arrow B1, and the gear 19 is turned in the direction of the arrow C1. When the gear 19 is turned in the direction of the arrow C1, the ring member 11a (the swivel member 11) is turned in the direction of the arrow D1 (See FIG. 4). When the swivel member 11 is turned, the connection member 22 that is fixed to the disk member 11c of the swivel member 11 is turned around the vertical axis so that the display apparatus main body portion 1 is turned in the direction of the arrow R as shown in FIG. 10. Thus, an orientation of the video display portion 2 of the display apparatus main body portion 1 can be changed to the right direction. In this case, since the boss portion 13b of the lid body 13 is fixed without turning, one end of the opening 11e of the disk member 11c abuts the boss portion 13b when the swivel member 11 continues to turn. Thus, the swivel member 11 is prevented from turning more than a predetermined turning angle in the direction of the arrow R.

Since the boss portion 13b is fixed without turning, the lead wire 16 drawn out from the top surface of the boss portion 13b is maintained in the static state without moving to the left or the right when the swivel member 11 turns. Therefore, it is suppressed that the lead wire 16 moves to the left or the right and is caught by the opening hole 5a of the cover member 5 or the like so that the lead wire 16 is pulled.

Furthermore, in order to turn the display apparatus main body portion 1 in the direction opposite to the above-mentioned case (toward the left), the operation opposite to the above description is performed. In this case too, similarly to the above-mentioned case, the lead wire 16 drawn out from the top surface of the boss portion 13b does not move to the left or the right when the swivel member 11 turns and is connected to the lead wire 16 of the display apparatus main body portion 1.

In the present embodiment, as described above, the swivel mechanism is housed in the housing portion 12a of the housing member 12, and the housing member 12 is provided to the base member 6 so as to overlap the swivel member 11, so that the region of the base member 6 in which the housing member 12 is disposed can be shared as the region in which the swivel member 11 is disposed. Therefore, when the swivel mechanism is housed in the housing portion 12a of the housing member 12, the region of the base member 6 in which the swivel mechanism is disposed can also be shared as the region in which the swivel member 11 is disposed. Thus, it is not necessary to provide a region for the swivel mechanism in the outside region of the base member 6 unlike the case where the swivel mechanism is disposed in the outside region of the base member 6, so the device can be downsized.

In the present embodiment, the swivel mechanism is housed in the housing portion 12a of the housing member 12 while the housing member 12 is fixed to the base member 6 so that the swivel mechanism housed in the housing portion 12a of the housing member 12 can be prevented from turning when the swivel member 11 is turned. Therefore, the lead wire 16 can be still when the swivel member 11 is turned.

Thus, it is possible to suppress damage to the lead wire 16 that can be generated when the lead wire 16 is caught by the opening hole 5a or the like so that the lead wire 16 is pulled.

In the present embodiment, the housing member 12 is provided with the protrusion 12e having a function of positioning the lid body 13, and the lid body 13 is provided with the boss portion 13b, and the boss portion 13b is provided with the notch portion 13c that engages the protrusion 12e and haves the second notch portion 132c for drawing out the lead wire 16 from the housing portion 12a of the housing member 12. Thus, the lid body 13 can be attached to a predetermined position of the housing member 12 by the engagement between the notch portion 13c and the protrusion 12e, and the lead wire 16 can be drawn out from the housing portion 12a of the housing member 12 through the second notch portion 132c of the notch portion 13c. As a result, the lead wire 16 can be drawn out from the housing portion 12a of the housing member 12 without providing a draw out portion for drawing out the lead wire 16 additionally to the notch portion 13c. Therefore, it is not necessary to provide a draw out portion adding to the notch portion 13c, so the number of manufacturing steps can be reduced.

In the present embodiment, the disk member 11c of the swivel member 11 is provided with the opening 11e to which the boss portion 13b is inserted, so that the movable range of the swivel member 11 can be restricted by the boss portion 13b. In addition, the lead wire 16 can be drawn out from the housing portion 12a of the housing member 12 through the second notch portion 132c of the notch portion 13c that is provided to the boss portion 13b. Therefore, the mechanism of the device can be simplified compared to the case where the notch portion 13c having the second notch portion 132c is provided to a portion other than the boss portion 13b. As a result, the device can be downsized easily, and the number of manufacturing steps can be reduced easily.

In the present embodiment, the protrusion 12e is provided integrally to the housing member 12, and the boss portion 13b is provided integrally to the lid body 13. Therefore, an increase in the number of components can be suppressed even in the case where the protrusion 12e is provided to the housing member 12 and the boss portion 13b is provided to the lid body 13.

In the present embodiment, the boss portion 13b is disposed in the vicinity of the motor 14 so that the second notch portion 132c of the notch portion 13c can be disposed in the vicinity of the motor 14. Therefore, the lead wire 16 can be drawn out from the housing portion 12a of the housing member 12 easily through the second notch portion 132c. Since the lead wire 16 can be prevented from contacting the swivel mechanism, damage to the lead wire 16 due to a contact between the lead wire 16 and the swivel mechanism can be suppressed easily.

At this point, the embodiment described above is merely an example in any case and should not be interrupted in a limited manner. The scope of the present invention is defined not by the above description of the embodiment but by the appended claims, which should be interpreted to include every equivalent and modification.

For example, although the embodiment described above shows an example in which the liquid crystal television set is attached to the swivel device so that it can turn, the present invention is not limited to this example. A display apparatus other than the liquid crystal television set may be attached to the swivel device. For example, a display apparatus such as a plasma television set or any type of character display apparatus may be attached to the swivel device.

Although the embodiment described above shows an example in which the boss portion is disposed in the vicinity of the motor, the present invention is not limited to this example. It is possible to dispose the boss portion in a position other than the vicinity of the motor.

Although the embodiment described above shows an example in which the protrusion is provided integrally to the housing member while the boss portion is provided integrally to the lid body, the present invention is not limited to this example. It is possible to provide the protrusion to the housing member separately and to provide the boss portion to the lid body separately.

Although the embodiment described above shows an example in which the boss portion for restricting the movable range of the swivel member is the circular arc rib, the present invention is not limited to this example. It is possible to form the boss portion in a shape other than the circular arc rib.

Although the embodiment described above shows an example in which the connector is provided to the end of the lead wire, the present invention is not limited to this example. It is possible to adopt the structure in which a connector is not provided to the end of the lead wire.

Although the embodiment described above shows an example in which the notch portion that engages the protrusion of the housing member is provided to the boss portion that restricts the movable range of the swivel member, the present invention is not limited to this example. It is possible to provide the notch portion that engages the protrusion of the housing member to a part other than the boss portion.

Although the embodiment described above shows an example in which the housing member is formed in a cylindrical shape while the swivel member is formed in a disk-like shape, the present invention is not limited to this example. It is possible to form the housing member in a shape other than the cylindrical shape and to form the swivel member in a shape other than the disk-like shape.

Although the embodiment described above shows an example in which the gear is used for transmitting the driving force of the motor, the present invention is not limited to this example. It is possible to use other than the gear, for example, pulleys and a belt, sprockets and a chain, or a combination of these and gears.

What is claimed is:

1. A swivel device comprising:
   a swivel mechanism to which a lead wire is connected;
   a swivel member that is capable of being turned by the swivel mechanism;
   a swivel mechanism housing portion that houses the swivel mechanism that is disposed so as to overlap the swivel member;
   a fixing member that fixes the swivel mechanism housing portion; and
   an attachment member that is attached to the swivel mechanism housing portion, wherein the swivel mechanism housing portion is provided with a first engaging portion for positioning the attachment member, and the attachment member is provided with a second engaging portion that engages the first engaging portion and has a draw out portion for drawing out the lead wire from the swivel mechanism housing portion,
   wherein the attachment member includes a protrusion that is provided with the second engaging portion,
   the swivel member includes an opening to which the protrusion is inserted, and
   the protrusion is designed so as to restrict a movable range of the swivel member by abutting the opening of the swivel member when the swivel member is turned.

2. The swivel device according to claim 1, wherein
the first engaging portion is provided integrally to the swivel mechanism housing portion, and
the protrusion is provided integrally to the attachment member.

3. The swivel device according to claim 2, wherein
the swivel mechanism includes a driving source for turning the swivel member,
the lead wire is connected electrically to the driving source, and
the protrusion is disposed in the vicinity of the driving source.

4. The swivel device according to claim 1, wherein
the swivel mechanism includes a driving source for turning the swivel member,
the lead wire is connected electrically to the driving source, and
the protrusion is disposed in the vicinity of the driving source.

5. A display apparatus equipped with a swivel device according to claim 1.

6. A swivel device comprising:
a swivel mechanism that includes a driving source to which a lead wire is connected;
a swivel member that is capable of being turned by the swivel mechanism;
a swivel mechanism housing portion that houses the swivel mechanism that is disposed so as to overlap the swivel member;
a fixing member that fixes the swivel mechanism housing portion; and
an attachment member that is attached to the swivel mechanism housing portion, to which a protrusion is provided integrally, wherein
the swivel member includes an opening to which the protrusion is inserted,
the protrusion of the attachment member is designed so as to restrict a movable range of the swivel member by abutting the opening of the swivel member when the swivel member is turned, and is disposed in the vicinity of the driving source,
the swivel mechanism housing portion is provided integrally with a first engaging portion that has a function of positioning the attachment member, and
the protrusion of the attachment member is provided with a second engaging portion that engages the first engaging portion provided to the swivel mechanism housing portion and has a draw out portion for drawing out the lead wire from the swivel mechanism housing portion.

* * * * *